Aug. 23, 1966  C. D. MURDOCH  3,268,043
MAGNETIC CLUTCH
Filed Feb. 14, 1964
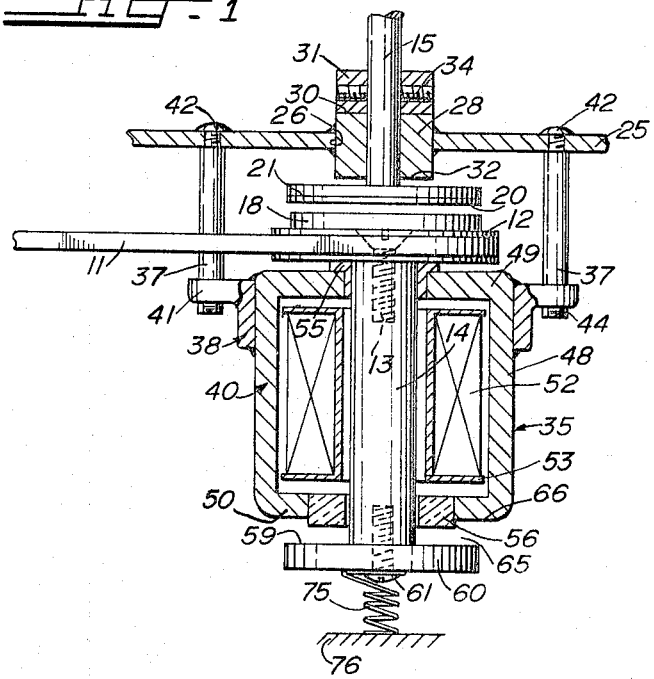
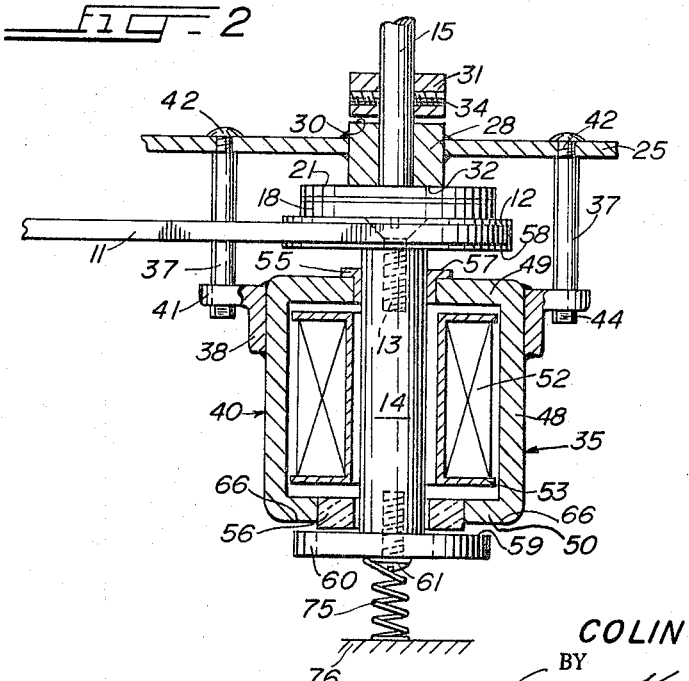
INVENTOR.
COLIN D. MURDOCH

United States Patent Office 3,268,043
Patented August 23, 1966

3,268,043
MAGNETIC CLUTCH
Colin D. Murdoch, Union City, Calif., assignor of twenty percent to Chad W. Pennebaker, San Leandro, Calif.
Filed Feb. 14, 1964, Ser. No. 344,907
5 Claims. (Cl. 192—84)

This invention relates to a magnetic clutch mechanism, and more particularly to a clutch mechanism wherein an electromagnet controls operation of the clutch.

In the field of business machines, and peripheral equipment, clutches are employed for selectively driving various operating mechanisms, usually by connecting a constantly rotating shaft to the operating mechanisms. Such clutches are often required to operate over a large number of cycles in relative short periods of time. Preferably, the clutch should have few operating elements of light mass to afford quick response in engaging and disengaging the clutch. Accordingly, an object of the present invention is a new and improved clutch of this general kind, having a simple and inexpensive design employing relatively few parts.

Another object of the invention is to provide a simplified clutch employing an actuating coil having a movable core that performs dual functions, the core constituting an important part of the magnetic circuit and also constituting the input shaft for the clutch.

A further object of the invention is an electromagnetic clutch which does not employ any springs for its operation, the clutch being engaged as the result of upward movement of a shaft-like core upon energization of the solenoid coil, and being disengaged by gravity upon de-energization of the solenoid coil.

According to a more specific object of the invention, the casing of the electromagnet, the input shaft, and an armature disk secured to one end of the input shaft form a flux path to attract and to move the armature and input shaft and thereby engage the clutch.

According to the preferred embodiment of the invention, the clutch mechanism employs an electromagnet with a vertically oriented core disposed within in a central bore in a coil. The core is in the form of a shaft that is constantly rotated within the coil. The core constitutes the input shaft of the clutch. An armature disc is secured to the shaft so that energization of the coil attracts the armature toward the casing. Movement of the armature disc lifts the shaft and moves the shaft into operative engagement with an output shaft disposed above the input shaft. De-energization of the coil permits the force of gravity to pull the input shaft downwardly away from operative engagement with the output shaft.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without department from the present invention and the purview of the appended claims.

In the drawings:

FIG. 1 is a sectional view illustrating the preferred embodiment of the clutch mechanism in its disengaged state; and FIG. 2 is a sectional view of the preferred embodiment of the clutch mechanism showing the clutch mechanism in its engaged state.

The drawings illustrate an electromagnetically controlled clutch mechanism, constructed in accordance with the invention, having an input belt 11 that is constantly driven to rotate an input pulley 12 and a shaft 14, shaft 14 being secured to the pulley by a threaded fastener 13. The clutch is shown in FIG. 1 in its disengaged state with the friction surface or facing 18 on the upper face of the pulley 12 spaced from a friction surface or face 20 on the lower surface of a disc 21 which is secured to an output shaft 15. When the clutch mechanism is engaged, as shown in FIG. 2, the opposed friction surfaces 18 and 20 are in engagement with each other and rotation of the pulley 12 and input shaft 14 drive the output disc 21, and output shaft 15.

The clutch mechanism is mounted on a main mounting plate 25. Plate 25 has a central aperture 26 in which a bearing 28 is mounted, the output shaft 15 being journaled in bearing 28. Preferably, the bearing 28 is of a self-lubricating plastic material such as nylon, Teflon or the like. The bearing 28 serves not only to guide the shaft 15 for rotation but also serves as a double thrust bearing having an upper thrust surface 30 engaging the lower surface of a shaft collar 31 and having a lower thrust surface 32 engaging the upper surface of the output disc 21. Thus, the shaft 15 is secured against downward movement by the shaft collar 31, which is secured to the output shaft 15 by suitable means such as the set screws 34. Preferably, the shaft 15 is permitted slight vertical movement so that only the lower thrust surface 32 is contacted when the clutch mechanism is engaged, as seen in FIG. 2.

The mounting plate 25 also serves to mount an electromagnet 35 which is spaced downwardly of the mounting plate 25 by a plurality of standoff tubes 37 secured by nut and bolt fasteners to a threaded collar 38. The collar 38 is welded or otherwise secured on the upper portion of an outer frame or casing 40 of the electromagnet 35. The collar 38 is angularly shaped, in section, having a horizontally disposed flange 41 with a plurality of openings therein for receiving the lower portions of the bolts 42, which are inserted through apertures in the mounting plates 25, through the bores in the standoffs 37, and through the openings in the flange 41. Suitable fasteners 44 are threaded on the ends of the bolts 42 to hold the collar 38 in spaced relationship to the mounting plate 25. Preferably, the collar 38 is of a non-ferrous or non-magnetic material so as not to be part of the flux path, which path will be traced hereinafter.

The frame or casing 40 is of a low-reluctance magnetic material and can be of square or circular configuration with vertically disposed side walls 48, an upper or top wall 49, and a lower or bottom wall 50. Casing 40 encloses a solenoid coil 52 disposed on a bobbin 53 suitably supported within the casing 40. The shaft 14 constitutes the core of the electromagnet as well as an input shaft for the clutch mechanism.

The casing 40 has an upper bearing 55 disposed in an aperture in its upper wall 49 for rotatably supporting the input shaft 14 and has a lower bearing 56 disposed in an aperture in its lower wall 50 for rotatably supporting the lower end of the input shaft 14. Preferably, the upper bearing 55 and lower bearing 56 are each made of a plastic material such as nylon, Teflon, or the like. The upper bearing 55 has an outer circular flange, the upper surface 57 of the flange constituting a thrust bearing surface for engaging and supporting the underside 58 of the pulley 12, which is likewise preferably formed of a plastic material.

The lower bearing 56 is not a thrust bearing since its lower surface will be spaced from contact with an upper surface 59 of an armature disc 60 even when the clutch is engaged, as seen in FIG. 2. The shaft 14 is of sufficient length to assure that the surface 59 of the armature disc 60 is spaced from the lower bearing 56 when the clutch is engaged so that the turning torque of the input shaft 14 is not dissipated by frictional rubbing between the surface 59 of the disc 60 and the bearing 55.

The lower bearing 56 is of a relatively large diameter so that when the coil is energized, the magnetic flux flowing through the vertical walls 48 and lower wall 50 of the casing 40 finds the path of least resistance to the shaft 14 to be across an air gap 65 to the armature 60. The armature 60 and shaft 14 are made of a magnetic material and serve to conduct the flux. Because the bearing 56 is of such generous portions, most of the magnetic current crosses the air gap 65 to the armature 60. Also, because the shaft 14 or core 14 is freely slidable in the bearings 55 and 56, the armature 60 can move the shaft 14 upwardly and thus reduce the air gap 65.

Energization of the coil 52 of the electromagnet 35 sets up a magnetic current or flux in the core or shaft 14. The magnetic circuit extends across the thin wall of the upper bearing 55, through the top wall 49, and across the air gap 65, and then through the armature 60 back into the shaft 14. Thus, when the coil 52 of the electromagnet 35 is energized, the armature disc 60 is attracted toward the lower surface 66 of the casing 40. The resulting vertical movement of shaft 14 brings the friction surface 18 on the pulley 12 upward into engagement with the frictional surface 20 on the output disc 21 secured to the output shaft 15. Since the pulley 12 is being rotated by the belt 11 and the frictional surfaces 18 and 20 are engaged, the output shaft 15 rotates with the pulley 12 and input shaft 14 so long as the coil 52 of the electromagnet 25 is energized.

When the coil 52 is de-energized, the magnetic field breaks down. The weight of the pulley 12, shaft 14 and armature 60 pull the shaft 14 downwardly and thereby move the friction surface 18 from engagement with the friction surface 20 on output disc 21. Thus, the clutch mechanism is disengaged. It will be seen that there are no springs needed in the clutch for causing disengagement, and that disengagement is by gravity alone.

The torque capable of being transmitted through the clutch can be increased by changing the electrical characteristics of the electromagnet such as by increasing the current in the solenoid coil 52 or by changing the number of ampere turns in the coil. Also, the friction surfaces 18, which are preferably of cork or other high-friction material, can be changed in configuration to afford a more positive gripping action, as by employing tooth surfaces on the opposed discs for transmitting torque, without changing the operation of the present invention.

The clutch mechanism has been illustrated in the drawings in its preferred orientation. However, the clutch mechanism is not to be construed as limited to this orientation. For example, any angle up to a slight angle of orientation from the horizontal will cause the clutch to disengage. Also, an inclination of the driving belt 11 to the horizontal could cause separation of the friction surfaces even though the clutch is disposed generally horizontal. Moreover, even if the clutch mechanism is disposed generally horizontal in its orientation little torque will be transmitted through the opposed friction faces until the electromagnet is energized to urge the friction surfaces in tight engagement with each other whereupon the driving torque of the input shaft is coupled to the output shaft. However, it is within the purview of the present invention that a return spring be employed to assist the separation of the friction faces. Thus, a spring 75 is shown attached between a fixed frame element 76 and armature disc 61 to illustrate how such a spring could be employed to assist in separation of the friction surfaces, if so desired, when the clutch mechanism is oriented generally in a horizontal position.

From the foregoing, it will be seen that the present invention employs a core 14 both as an input shaft for the clutch mechanism and as a part of the electromagnet so that attraction of the armature 60 in response to energization of the coil couples the input shaft to a superimposed output shaft. Also, it will be seen that, preferably, gravity is used to disengage the clutch mechanism. The clutch mechanism has relatively few and inexpensive elements of light mass, thereby constituting a desirable type of clutch for driving instrumentalities such as tape feeds in tape recording equipment. Since a constant torque may be developed in the output shaft 15, the clutch is adapted for use as a constant tension device in a take-up reel for tape or the like.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A clutch mechanism actuatable between engaged and dis-engaged conditions in response to energization and de-energization of a solenoid coil, comprising:
   a solenoid coil;
   a frame of magnetic material supporting said coil, said frame extending from end to end of said coil;
   a continuously rotating input shaft of magnetic material extending through said coil and movable axially thereof, said input shaft constituting the sole magnetic core element for said coil, said input shaft being in close proximity to said frame at one end of said coil and being spaced from said frame by a non-magnetic gap of substantial length at the other end of said coil;
   an output shaft aligned axially with said input shaft; and
   an armature disc of magnetic material, mounted on said input shaft adjacent said other end of said coil in position to divert a substantial part of the magnetic flux developed upon energization of said coil around said non-magnetic gap, for moving said input shaft axially of said core into and out of engagement with said output shaft in response to energization and de-energization of said coil.

2. The clutch mechanism of claim 1 wherein said input shaft has a friction surface thereon, and wherein said output shaft has a complementary friction surface thereon for engagement with the friction surface on said input shaft when said clutch mechanism is engaged.

3. In an electromagnetically operated clutch mechanism, an electromagnet, an output shaft disposed vertically;
   a continuously rotating input shaft of magnetic material disposed beneath said output shaft and adapted to move vertically upward to engage the output shaft when said electromagnet is energized, said input shaft being moved downwardly under the force of gravity when said electromagnet is de-energized;
   said electromagnet including a frame means in which is journaled said rotating input shaft, said frame means and said input shaft constituting a part of the flux path for said electromagnet, said input shaft extending completely through said electromagnet and constituting the only internal magnetic core for said electromagnet;
   an armature of magnetic material, secured to said input shaft and spaced from said frame means by a given air gap and movable vertically upon energization of the electromagnet to lift said input shaft into driving engagement with said output shaft and to narrow the air gap between said armature and said frame means;
   a pulley secured to said input shaft and adapted to rotate said input shaft;
   a friction surface on said pulley; and
   a friction surface on said output shaft whereby movement of said shaft vertically moves the friction surfaces into engagement with each other to cause rotation of said output shaft with rotation of said pulley and said input shaft.

4. In an electromagnetically controlled clutch mechanism, an electromagnet having a frame;
   a coil disposed in said frame with a vertically extending bore in said coil;
   a vertical input shaft of magnetic material extending through said vertically oriented bore in said coil, said input shaft adapted to be rotated and moved vertically, said shaft constituting the sole internal magnetic core for said coil;
   an upper bearing having a thrust surface thereon for supporting said shaft when said clutch is disengaged;
   a lower bearing in said electromagnet for said shaft;
   an armature disc of magnetic material, secured to said shaft and spaced from said frame by a given air gap and movable toward said lower bearing when said clutch is engaged;
   said lower bearing being of a non-magnetic material and of a width greater than the distance of the air gap between said armature and said frame so that the flux flowing through said input shaft and said frame flows through the shorter path to said armature and attracts said armature toward the bottom surface of said lower bearing to reduce the air gap between said armature and said frame upon energization of said coil.

5. A clutch mechanism actuatable between engaged and disengaged conditions in response to energization and de-energization of a solenoid coil, comprising:
   a solenoid coil;
   a frame of magnetic material supporting said coil, said frame extending from one end of said coil to the other end thereof;
   a first rotatable shaft of magnetic material extending through said coil and movable axially thereof, said first shaft constituting the only magnetic core element for said coil, said first shaft being disposed in close proximity to said frame at one end of said coil and being spaced from said frame by a non-magnetic gap of substantial length at the other end of said coil;
   a second rotatable shaft aligned axially with said first rotatable shaft;
   an armature disc of magnetic material, mounted on said first shaft adjacent said other end of said coil in position to divert a substatial part of the magnetic flux developed upon energization of said coil around said non-magnetic gap, for moving said first shaft axially of said core into and out of torque-transmitting engagement with said second shaft in response to energization and de-energization of said coil; and
   means on one of said shafts for preventing direct engagement of said armature disc with said frame when said coil is energized.

References Cited by the Examiner

UNITED STATES PATENTS

| 2,180,412 | 11/1939 | Hart | 192—84 |
| 2,203,024 | 6/1940 | Lewis et al. | |
| 2,464,129 | 3/1949 | Goettisheim. | |
| 2,724,281 | 11/1955 | Summers et al. | 192—84 X |
| 3,181,671 | 5/1965 | Gruenbeck et al. | 192—84 |

FOREIGN PATENTS 616,978  3/1961  Canada.

DAVID J. WILLIAMOWSKY, *Primary Examiner.*

DON A. WAITE, *Examiner.*

A. T. McKEON, *Assistant Examiner.*